(12) United States Patent
Kintsu

(10) Patent No.: US 11,108,081 B2
(45) Date of Patent: Aug. 31, 2021

(54) METHOD FOR PRODUCING SULFIDE SOLID ELECTROLYTE PARTICLES

(71) Applicant: TOYOTA JIDOSHA KABUSHIKI KAISHA, Toyota (JP)

(72) Inventor: Yusuke Kintsu, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 210 days.

(21) Appl. No.: 16/359,673

(22) Filed: Mar. 20, 2019

(65) Prior Publication Data

US 2019/0319302 A1 Oct. 17, 2019

(30) Foreign Application Priority Data

Apr. 13, 2018 (JP) .............................. JP2018-077793

(51) Int. Cl.
*H01M 10/0562* (2010.01)
*H01M 10/0525* (2010.01)
*H01M 10/0585* (2010.01)

(52) U.S. Cl.
CPC ... *H01M 10/0562* (2013.01); *H01M 10/0525* (2013.01); *H01M 10/0585* (2013.01); *H01M 2300/0068* (2013.01)

(58) Field of Classification Search
CPC .............................................. H01M 10/0562
See application file for complete search history.

(56) References Cited

FOREIGN PATENT DOCUMENTS

| | | | |
|---|---|---|---|
| JP | 2008-004459 A | | 1/2008 |
| JP | 2008004459 A | * | 2/2008 |
| JP | 2010030889 A | * | 2/2010 |
| JP | 2012-129150 A | | 7/2012 |
| JP | 2013-069416 A | | 4/2013 |
| JP | 2018133227 A | * | 8/2018 |
| WO | 2018/193992 A1 | | 10/2018 |

OTHER PUBLICATIONS

Translation of JP 2010-030889 A (Year: 2010).*
Translation of JP 2008-004459 A (Year: 2008).*
Translation of JP 2018-133227 A (Year: 2018).*

* cited by examiner

*Primary Examiner* — Robert S Carrico
(74) *Attorney, Agent, or Firm* — Oliff PLC

(57) ABSTRACT

A method for efficiently producing sulfide solid electrolyte particles which are particles in spherical form and which have a small particle diameter. The method comprises: preparing a sulfide solid electrolyte material, grinding the sulfide solid electrolyte material by mechanical milling to obtain particles in flattened form (a first grinding step), and grinding the particles in flattened form by mechanical milling to obtain sulfide solid electrolyte particles in spherical form (a second grinding step), wherein a relationship A (J)>B (J) is satisfied, where A (J) is a kinetic energy ($\frac{1}{2}(mv^2)$) per grinding medium used in the first grinding step, and B (J) is a kinetic energy ($\frac{1}{2}(mv^2)$) per grinding medium used in the second grinding step.

9 Claims, 4 Drawing Sheets

Preparing step

After completion of first grinding step

After completion of second grinding step

Grinding time: 0 Hour

Grinding time: 1 Hour

Grinding time: 4 Hours

METHOD FOR PRODUCING SULFIDE SOLID ELECTROLYTE PARTICLES

TECHNICAL FIELD

The disclosure relates to a method for producing sulfide solid electrolyte particles.

BACKGROUND

A sulfide solid electrolyte is used as a material for electrodes or solid electrolyte layers in all-solid-state lithium ion batteries, due to its high Li ion conductivity.

For example, Patent Literature 1 discloses a sulfide solid electrolyte in scaly form. Patent Literature 1 describes that a thin solid electrolyte layer can be produced by use of the sulfide solid electrolyte in scaly form.

Patent Literature 2 discloses sulfide solid electrolyte microparticles having an average particle diameter of from 0.1 μm to 10 μm and a method for producing the microparticles.

Patent Literature 1: Japanese Patent Application Laid-Open (JP-A) No. 2012-129150
Patent Literature 2: JP-A No. 2008-004459

A sulfide solid electrolyte is characterized in that when it is ground by mechanical milling using strong grinding energy, it is formed into fine particles in flattened form. Patent Literature 1 utilizes the characteristic to produce the sulfide solid electrolyte in scaly form.

However, it was found that in the case of using sulfide solid electrolyte particles in flattened form as a material for cathode or anode, a conductive material or electrode active material in an electrode may be non-uniformly present on the surface of the sulfide solid electrolyte particles in flattened form and may affect capacity retention rate, etc. The reason seems to be as follows: the sulfide solid electrolyte particles in flattened form have a large surface area per volume, compared to sulfide solid electrolyte particles in spherical form. Accordingly, there is a demand for a technique for producing the sulfide solid electrolyte particles in flattened form and the sulfide solid electrolyte particles in spherical form, separately.

However, as described above, the sulfide solid electrolyte is flattened when high grinding energy is applied thereto. Therefore, to obtain the sulfide solid electrolyte particles in spherical form, it is needed to grind the sulfide solid electrolyte by weak grinding energy. However, to obtain the sulfide solid electrolyte particles in fine spherical form by applying weak grinding energy, it is needed to grind the sulfide solid electrolyte for a long period of time. Therefore, it is not possible to efficiently produce the sulfide solid electrolyte particles in spherical form.

SUMMARY

The disclosed embodiments were achieved in light of the above circumstance. An object of the disclosed embodiments is to provide a method for efficiently producing sulfide solid electrolyte particles in fine spherical form.

In a first embodiment, there is provided a method for producing sulfide solid electrolyte particles, the method comprising:
preparing a sulfide solid electrolyte material,
grinding the sulfide solid electrolyte material by mechanical milling to obtain particles in flattened form (a first grinding step), and
grinding the particles in flattened form by mechanical milling to obtain sulfide solid electrolyte particles in spherical form (a second grinding step),
wherein a relationship A (J)>B (J) is satisfied, where A (J) is a kinetic energy ($\frac{1}{2}(mv^2)$) per grinding medium used in the first grinding step, and B (J) is a kinetic energy ($\frac{1}{2}(mv^2)$) per grinding medium used in the second grinding step.

A median diameter ($D_{50}$) of the particles in flattened form obtained in the first grinding step may be 2.0 μm or less, and a median diameter ($D_{50}$) of the sulfide solid electrolyte particles obtained in the second grinding step may be 1.0 μm or less.

The kinetic energy A per grinding medium used in the first grinding step may be in a range of from $3.0 \times 10^{-7}$ (J) to $1.0 \times 10^{-5}$ (J), and the kinetic energy B per grinding medium used in the second grinding step may be in a range of from $1.0 \times 10^{-8}$ (J) to $1.6 \times 10^{7}$ (J).

The kinetic energy A per grinding medium used in the first grinding step may be in a range of from $3.0 \times 10^{-7}$ (J) to $1.0 \times 10^{-5}$ (J); the kinetic energy B per grinding medium used in the second grinding step may be in a range of from $1.0 \times 10^{-8}$ (J) to $3.5 \times 10^{-7}$ (J); and a grinding temperature used in the second grinding step may be 40° C. or more.

According to the disclosed embodiments, a method for efficiently producing sulfide solid electrolyte particles in fine spherical form, can be provided.

BRIEF DESCRIPTION OF THE DRAWINGS

In the accompanying drawings.

DETAILED DESCRIPTION

Figure 1:
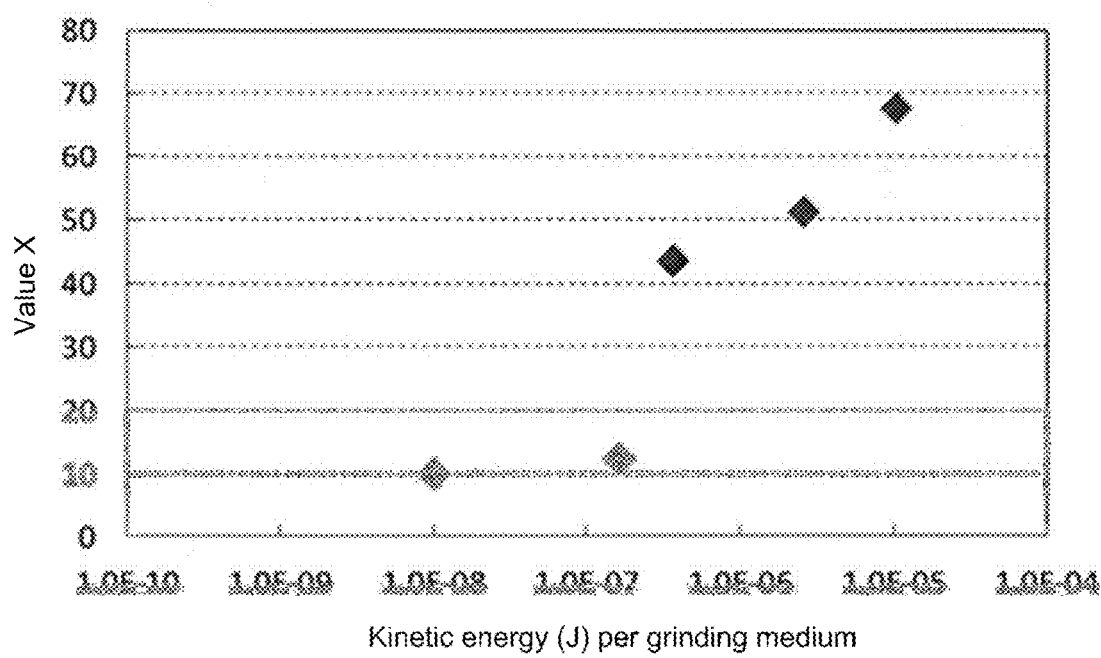
FIG. 1 is a graph showing a relationship between kinetic energy per grinding medium at 25° C. and value X of sulfide solid electrolyte particles thus obtained.

The method for producing the sulfide solid electrolyte particles according to the disclosed embodiments is a method for producing sulfide solid electrolyte particles, the method comprising: preparing a sulfide solid electrolyte material, grinding the sulfide solid electrolyte material by mechanical milling to obtain particles in flattened form (a first grinding step), and grinding the particles in flattened form by mechanical milling to obtain sulfide solid electrolyte particles in spherical form (a second grinding step), wherein a relationship A (J)>B (J) is satisfied, where A (J) is a kinetic energy ($\frac{1}{2}(mv^2)$) per grinding medium used in the first grinding step, and B (J) is a kinetic energy ($\frac{1}{2}(mv^2)$) per grinding medium used in the second grinding step.

As described above, the sulfide solid electrolyte is a material characterized in that when it is ground by mechanical milling using strong grinding energy, it is formed into fine particles in flattened form. Therefore, to obtain sulfide solid electrolyte fine particles which are particles in spherical form and which have a small surface area per volume, it is needed to grind the sulfide solid electrolyte by weak grinding energy for a long period of time.

In the production method of the disclosed embodiments, the sulfide solid electrolyte is ground by two-step mechanical milling. In the first step, the sulfide solid electrolyte is ground by such a strong energy that forms the sulfide solid electrolyte into particles in flattened form. In the second step, the particles in flattened form are ground by weak energy to obtain fine particles in spherical form. Therefore, it is possible to efficiently obtain the spherical fine particles of the sulfide solid electrolyte, in a shorter period of time than ever.

Hereinafter, the production method of the disclosed embodiments and the sulfide solid electrolyte particles obtained by the production method of the disclosed embodiments, will be described in order.

1. Method for Producing Sulfide Solid Electrolyte Particles (1) Preparing Sulfide Solid Electrolyte Material In the production method of the disclosed embodiments, to produce the aimed sulfide solid electrolyte particles, a sulfide solid electrolyte material is prepared. As described above, due to its ductility, the sulfide solid electrolyte is characterized in that it is formed into particles in flattened form when it is ground by strong kinetic energy.

The sulfide solid electrolyte material used in the production method of the disclosed embodiments is not particularly limited. In general, the sulfide solid electrolyte material contains a metal element (M), which serves as ions to be conducted, and sulfur (S). As the metal element M, examples include, but are not limited to, Li, Na, K, Mg and Ca. The metal element M may be Li, since the sulfide solid electrolyte material can be a sulfide solid electrolyte material that is useful in all-solid-state lithium batteries. Especially, the sulfide solid electrolyte material of the disclosed embodiments may contain Li, A (A is at least one selected from the group consisting of P, Si, Ge, Al and B) and S. The A may be phosphorus (P). The sulfide solid electrolyte material of the disclosed embodiments may also contain a halogen such as Cl, Br and I, because higher ion conductivity is obtained. The sulfide solid electrolyte material of the disclosed embodiments may also contain 0.

As the sulfide solid electrolyte material in which Li is contained as the metal element (M) that serves as the ions to be conducted, examples include, but are not limited to, $Li_2S$—$P_2S_5$, $Li_2S$—$P_2S_5$—LiI, $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (where m and n are positive numbers, and Z is any one of Ge, Zn and Ga), $Li_2S$—$GeS_2$, $Li_2S$—$SiS_2$—$Li_3PO_4$, and $Li_2S$—$SiS_2$-$Li_xAO_y$, (where x and y are positive numbers, and A is any one of P, Si, Ge, B, Al, Ga and In). As used herein, "$Li_2S$—$P_2S_5$" means a sulfide solid electrolyte material comprising a raw material composition containing $Li_2S$ and $P_2S_5$, and the same applies to other descriptions.

When the sulfide solid electrolyte material of the disclosed embodiments is a material comprising a raw material composition containing $Li_2S$ and $P_2S_5$, the percentage of the $Li_2S$ to the total of the $Li_2S$ and the $P_2S_5$ may be in a range of from 70 mol % to 80 mol %, may be in a range of from 72 mol % to 78 mol %, or may be in a range of from 74 mol % to 76 mol %, for example. This is because such a sulfide solid electrolyte material can be a sulfide solid electrolyte material having an ortho or similar composition and can be a sulfide solid electrolyte material having high chemical stability. As used herein, "ortho" generally means an oxoacid having the highest hydration degree, out of oxoacids obtained by hydrating the same oxide. In the disclosed embodiments, the crystal composition in which the largest amount of $Li_2S$ is attached to the sulfide, is referred to as the ortho composition. Out of $Li_2S$—$P_2S_5$ systems, $Li_3PS_4$ corresponds to the ortho composition. In the case of the $Li_2S$—$P_2S_5$ sulfide solid electrolyte material, the $Li_2S$ and the $P_2S_5$ are at a molar ratio of 75:25 ($Li_2S$:$P_2S_5$) to obtain the ortho composition. Even in the case of the raw material composition in which $Al_2S_3$ or $B_2S_3$ is used in place of the $P_2S_5$, the range of the percentage of the $Li_2S$ to the total of the $Li_2S$ and the $Al_2S_3$ or $B_2S_3$, may be the same range as described above. Out of $Li_2S$—$Al_2S_3$ systems, $Li_3AlS_3$ corresponds to the ortho composition. Out of $Li_2S$—$B_2S_3$ systems, $Li_3BS_3$ corresponds to the ortho composition.

When the sulfide solid electrolyte material of the disclosed embodiments is a material comprising a raw material composition containing $Li_2S$ and $SiS_2$, the percentage of the $Li_2S$ to the total of the $Li_2S$ and the $SiS_2$ may be in a range of from 60 mol % to 72 mol %, may be in a range of from 62 mol % to 70 mol %, or may be in a range of from 64 mol % to 68 mol %, for example. This is because such a sulfide solid electrolyte material can be a sulfide solid electrolyte material having an ortho or similar composition and can be a sulfide solid electrolyte material having high chemical stability. Out of $Li_2S$—$SiS_2$ systems, $Li_4SiS_4$ corresponds to the ortho composition. In the case of the $Li_2S$—$SiS_2$ sulfide solid electrolyte material, the $Li_2S$ and the $SiS_2$ are at a molar ratio of 66.6:33.3 ($Li_2S$:$SiS_2$) to obtain the ortho composition. Even in the case of the raw material composition in which $GeS_2$ is used in place of the $SiS_2$, the range of the percentage of the $Li_2S$ to the total of the $Li_2S$ and the $GeS_2$, may be the same range as described above. Out of $Li_2S$—$GeS_2$ systems, $Li_4GeS_4$ corresponds to the ortho composition.

When the sulfide solid electrolyte material of the disclosed embodiments is a material comprising a raw material composition containing LiX (X=Cl, Br or I), the percentage of the LiX may be in a range of from 1 mol % to 60 mol %, may be in a range of from 5 mol % to 50 mol %, or may be in a range of from 10 mol % to 40 mol %, for example.

The sulfide solid electrolyte material of the disclosed embodiments may be a sulfide glass, a crystallized sulfide glass or a crystalline material.

In the production method of the disclosed embodiments, the thus-prepared sulfide solid electrolyte material, which is in the form of a coarse and/or heterogeneous mass, is ground by the following grinding steps.

(2) First Grinding Step

In the first grinding step of the production method of the disclosed embodiments, the above-prepared sulfide solid electrolyte material is ground by mechanical milling to obtain particles in flattened form.

The mechanical milling is a method for finely grinding a solid by stirring with a device that uses a grinding medium such as grinding balls. In the first grinding step of the production method of the disclosed embodiments, dry grinding or wet grinding may be used as long as the grinding medium and the sulfide solid electrolyte material prepared above are mixed and stirred. However, as described above, since the sulfide solid electrolyte has ductility and easily attaches to the ball grinding medium, a container, etc., wet grinding may be used.

In the disclosed embodiments, "flattened form" means crushed sphere form.

In the disclosed embodiments, a parameter used to determine whether the particles are particles in flattened form or not, is not particularly limited. For example, the parameter may be as follows: as a result of measuring the median diameter of the sulfide solid electrolyte particles and the average short diameter of the particles observed with an electron microscope, the median diameter is found to be 3 times or more the average short diameter; the median diameter is found to be 5 times or more the average short diameter; or the median diameter is found to be 8.7 times or more the average short diameter.

Also, the value X of the solid electrolyte particles obtained by the following formula (1) may be used as the parameter to determine that the particles are particles in flattened form.

$$X = \text{BET specific surface area (m}^2\text{/g)} \times \text{Median diameter } D50(\mu m) \times \text{Density}(g/cm^3) \quad \text{Formula (1)}$$

In the disclosed embodiments, the median diameter is a diameter at which, when the diameters of the particles are arranged in ascending order, the accumulated volume of the particles is half (50%) of the total volume of the particles.

The value X is the parameter of the particle form. When the particles are particles in perfect spherical form, the value X is 6.0. In the disclosed embodiments, "form" means a form including fine concavities and convexities on the particle surface and pores that are present inside the particles.

For example, the parameter used to determine that the particles are particles in flattened form, may be as follows: the value X is 25 or more; the value X is 30 or more; or the value X is 40 or more.

In the production method of the disclosed embodiments, the median diameter ($D_{50}$) of the particles in flattened form obtained in the first grinding step, may be 2.0 μm or less, since the aimed sulfide solid electrolyte particles in fine spherical form can be efficiently obtained in the below-described second grinding step.

In the production method of the disclosed embodiments, the sulfide solid electrolyte material is ground so that the relationship A (J)>B (J) is satisfied, where A (J) is the kinetic energy ($\frac{1}{2}(mv^2)$) per grinding medium used in the first grinding step, and B (J) is the kinetic energy ($\frac{1}{2}(mv^2)$) per grinding medium used in the below-described second grinding step.

In the first grinding step, by grinding the sulfide solid electrolyte material by relatively strong energy, the sulfide solid electrolyte particles which have a small particle diameter and which are particles in flattened form, can be obtained for a short period of time.

A parameter m is used to obtain the kinetic energy ($\frac{1}{2}(mv^2)$) per grinding medium. It can be obtained by the following calculation formula:

$$m = \text{Density of grinding medium} \times \text{Volume(cm}^3\text{)per grinding medium}$$

The volume per grinding medium in the above formula can be obtained by the following calculation formula:

$$\text{Volume(cm}^3\text{)per grinding medium} = (4 \times \pi \times (\text{radius of grinding medium(cm}^2))^3)/3$$

In addition, a parameter v is used to obtain the kinetic energy ($\frac{1}{2}(mv^2)$) per grinding medium. It can be obtained by the following calculation formula:

$$v = \text{Peripheral speed of grinding device}$$

In the case of using a planetary ball mill, the parameter v can be obtained by the following calculation formula:

$$v = (d \times \pi \times R \times \alpha)/(1000 \times 60)$$

d: Inner diameter (mm) of planetary ball mill pot
R: Plate rotational frequency (rpm)
α: Revolution/rotation ratio (−)

The thus-obtained parameters m and v are plugged into $\frac{1}{2}(mv^2)$, thereby obtaining the kinetic energy per grinding medium. This kinetic energy indicates the highest kinetic energy per grinding medium. In the production method of the disclosed embodiments, the kinetic energy A per grinding medium used in the first grinding step may be in a range of from $3.0 \times 10^{-7}$ (J) to $1.0 \times 10^{-5}$ (J), or it may be in a range of from $1.0 \times 10^{-8}$ (J) to $1.6 \times 10^{-7}$ (J).

FIG. 1 shows a relationship between the kinetic energy per grinding medium and the value X, in the case where the sulfide solid electrolyte material is ground at 25° C. until the thus-obtained particles obtain the specific median diameter. According to FIG. 1, at 25° C., the value X is in a range of from about 6 to about 10, and the particles are kept in spherical form, when the kinetic energy per grinding medium is in a range of from $1.0 \times 10^{-8}$ (J) to $1.6 \times 10^{-7}$ (J). However, the value X is in a range of from about 40 to about 68, and the particles are particles in flattened form, when the kinetic energy per grinding medium is in a range of from $3.0 \times 10^{-7}$ (J) to $1.0 \times 10^{-5}$ (J).

(3) Second Grinding Step

In the second grinding step of the production method of the disclosed embodiments, the sulfide solid electrolyte particles in flattened form obtained in the first grinding step are ground by mechanical milling to obtain sulfide solid electrolyte particles in fine spherical form. In the second grinding step of the production method of the disclosed embodiments, as with the first step, dry grinding or wet grinding may be used. Of them, wet grinding may be used.

In the disclosed embodiments, "particles in spherical form" means particles in near-perfect spherical form. The parameter used to determine whether the particles are particles in spherical form or not, is not particularly limited. For example, the parameter may be any one of the following: as a result of measuring the median diameter of the sulfide solid electrolyte particles and the average short diameter of the particles observed with an electron microscope, the median diameter is found to be 8 times or less the average short diameter; the median diameter is found to be 3 times or less the average short diameter; and the median diameter is found to be 2.3 times or less the average short diameter.

Also, the value X of the solid electrolyte particles obtained by the above formula (1) may be used as the parameter to determine that the particles are particles in spherical form. For example, the parameter may be as follows: the value X is 35 or less; the value X is 30 or less; or the value X is 23 or less.

In the production method of the disclosed embodiments, the median diameter ($D_{50}$) of the sulfide solid electrolyte particles in spherical form obtained in the second grinding step may be 1.0 μm or less.

In the production method of the disclosed embodiments, the sulfide solid electrolyte material and the particles in flattened form are ground so that the relationship A (J)>B (J) is satisfied, where A (J) is the kinetic energy ($\frac{1}{2}(mv^2)$) per grinding medium used in the first grinding step, and B (J) is the kinetic energy ($\frac{1}{2}(mv^2)$) per grinding medium used in the second grinding step.

In the second grinding step, by grinding the particles in flattened form obtained in the first grinding step by relatively weak energy, they can be sulfide solid electrolyte particles in spherical form.

As shown in FIG. 1, when the second grinding step is carried out at room temperature, without heating, to obtain the sulfide solid electrolyte particles in spherical form, the kinetic energy B per grinding medium may be in a range of from $1.0 \times 10^{-8}$ (J) to $1.6 \times 10^{-7}$ (J), or it may be in a range of from $4.0 \times 10^{-8}$ (J) to $1.6 \times 10^{7}$ (J).

Also, the second grinding step may be carried out at a grinding temperature of 40° C. or more, so that the kinetic energy B per grinding medium can be in a range of from $1.0 \times 10^8$ (J) to $3.5 \times 10^7$ (J).

2. Sulfide Solid Electrolyte Particles Obtained by the Production Method of the Disclosed Embodiments The sulfide solid electrolyte particles obtained by the production method of the disclosed embodiments, have a small particle diameter and are particles in spherical form. Therefore, they have a small specific surface area compared to particles having the same particle diameter. Therefore, for example, by using the sulfide solid electrolyte particles as a material for batteries, due to their small particle size, the area of contact points between the sulfide solid electrolyte particles in electrodes of solid batteries can be increased. In addition, due to their small specific surface area, they can suppress uneven excessive distribution of a conductive material or electrode active material on the sulfide solid electrolyte surface.

Especially in the case of an anode in which an alloy-based active material (as typified by elemental Si) is used as the anode active material, the anode active material repeats expansion and contraction by charge-discharge reactions. Therefore, when sulfide solid electrolyte particles having a large specific surface area are used, there is a problem in that an electron conducting path is cut in a part where the density of the conductive material is low, and a poor capacity retention rate is obtained.

Therefore, the sulfide solid electrolyte particles having a small specific surface area obtained by the production method of the disclosed embodiments, are especially suitable for solid-state batteries in which the alloy-based active material is used as the anode active material.

EXAMPLES

1. Production of Sulfide Solid Electrolyte
A. Study on Influence of Grinding Energy Per Grinding Medium Example 1

(1) Preparing Sulfide Solid Electrolyte Material
A sulfide solid electrolyte material represented by the compositional formula $15LiBr-10LiI-75(75Li_2S-25P_2S_5)$ was prepared.
(2) First Grinding Step
Under an Ar gas atmosphere, at room temperature, 50 g of the sulfide solid electrolyte material represented by the compositional formula $15LiBr-10LiI-75(75Li_2S-25P_2S_5)$, 485 g of $ZrO_2$ balls (diameter 0.3 mm), 265 g of dehydrated heptane, and 135 g of di-n-butyl ether were put in the slurry tank of a beads mill (product name: LMZ015, manufactured by: Ashizawa Finetech Ltd.) The first grinding step was carried out thereon by wet mechanical milling in the condition of a peripheral speed of 16 m/s for one hour, thereby obtaining a slurry of sulfide electrolyte particles.
(3) Second Grinding Step
Under the Ar gas atmosphere, the slurry of the sulfide electrolyte particles obtained in the first grinding step was put in a zirconia pot, and the pot was hermetically closed. The zirconia pot was installed in a planetary ball mill (product name: P-7, manufactured by: FRITSCH). The second grinding step was carried out thereon by wet mechanical milling at room temperature, in the condition of a plate rotational frequency of 200 rpm for one hour, thereby obtaining a slurry containing the sulfide electrolyte particles of Example 1.

The thus-obtained slurry was dried on a hot plate at 210° C. for three hours for removal of the solvent. After the drying, the slurry was heat-treated at 210° C. for another 3 hours, thereby obtaining sulfide solid electrolyte particles of Example 1.

Example 2

Sulfide solid electrolyte particles of Example 2 were obtained in the same manner as Example 1, except that the wet mechanical milling time of the first grinding step was changed to two hours.

Comparative Example 1

Sulfide solid electrolyte particles of Comparative Example 1 were obtained in the same manner as Example 1, except that the wet mechanical milling time of the first grinding step was changed to 4 hours, and the second grinding step was not carried out.

Comparative Example 2

Sulfide solid electrolyte particles of Comparative Example 2 were obtained in the same manner as Example 1, except that the first grinding step was not carried out, and the wet mechanical milling of the second grinding step was carried out in the condition of a plate rotational frequency of 150 rpm for 10 hours.

B. Study on Influence of Temperature in the Second Grinding Step

Example 3

Sulfide solid electrolyte particles of Example 3 were obtained in the same manner as Example 1, except that the second grinding step was carried out on the slurry of the sulfide electrolyte particles obtained in the first grinding step, which was in the slurry tank of the beads mill (product name: LMZ015, manufactured by: Ashizawa Finetech Ltd.), by using the beads mill as it was, in the condition of a temperature of 40° C. and a peripheral speed of 3 m/s for three hours.

Example 4

Sulfide solid electrolyte particles of Example 4 were obtained in the same manner as Example 3, except that the second grinding step was carried out in the condition of a temperature of 50° C. and a peripheral speed of 3 m/s for two hours.

Example 5

Sulfide solid electrolyte particles of Example 5 were obtained in the same manner as Example 3, except that the treatment time of the first grinding step was changed to two hours, and the second grinding step was carried out in the condition of a temperature of 50° C. and a peripheral speed of 3 m/s for three hours.

Example 6

Sulfide solid electrolyte particles of Example 6 were obtained in the same manner as Example 3, except that the treatment time of the first grinding step was changed to 4 hours, and the second grinding step was carried out in the condition of a temperature of 50° C. and a peripheral speed of 3 m/s for 4 hours.

Comparative Example 3

Sulfide solid electrolyte particles of Comparative Example 3 were obtained in the same manner as Example 3, except that the second grinding step was carried out in the condition of a temperature of 25° C. and a peripheral speed of 3 m/s for three hours.

Comparative Example 4

Sulfide solid electrolyte particles of Comparative Example 4 were obtained in the same manner as Example 3, except that the second grinding step was carried out in the condition of a temperature of 50° C. and a peripheral speed of 5 m/s for three hours.

Comparative Example 5

Sulfide solid electrolyte particles of Comparative Example 5 were obtained in the same manner as Example 3, except that the second grinding step was carried out in the condition of a temperature of 50° C. and a peripheral speed of 7 m/s for three hours.

2. Production of Lithium Ion Secondary Battery
(1) Production of Anode Mixture

The following raw materials were put in a polypropylene container: the sulfide solid electrolyte particles of Example 1 obtained in the above "1. Production of sulfide solid electrolyte"; elemental Si particles (average particle diameter 5 μm) as an anode active material; VGCF as a conductive material; and a 5 mass % solution of PVdF-based resin in butyl butyrate as a binder. The container was subjected to ultrasonic treatment for 30 seconds in an ultrasonic disperser. Then, the container was shaken by a shaking device for 30 minutes, thereby preparing a raw material for anode mixture.

A Cu foil was used as a current collector, and the thus-prepared raw material for anode mixture was applied on the Cu foil by the blade method using an applicator. The foil was placed on the hot plate at 100° C. for 30 minutes to dry the applied raw material for anode mixture. Preparatory pressing was carried out thereon, thereby producing an anode mixture.

In the same manner as above, anode mixtures were produced by use of the sulfide solid electrolyte particles obtained in Examples 2 to 6 and Comparative Examples 1 to 5.

(2) Production of Cathode Mixture

The following raw materials were put in a polypropylene container: $Li_2S$—$P_2S_5$-based amorphous solid electrolyte containing LiBr and LiI (average particle diameter 0.8 μm) as a solid electrolyte; $LiNi_{1/3}Co_{1/3}Mn_{1/3}O_2$ particles (average particle diameter 6 μm) as a cathode active material; a 5 mass % solution of PVdF-based resin in butyl butyrate as a binder; and VGCF as a conductive material. The container was subjected to ultrasonic treatment for 30 seconds in the ultrasonic disperser. Then, the container was shaken by a shaking device for 30 minutes, thereby preparing a raw material for cathode mixture.

An Al foil was used as a current collector, and the thus-prepared raw material for cathode mixture was applied on the Al foil by the blade method using the applicator. The foil was placed on the hot plate at 100° C. for 30 minutes to dry the applied raw material for cathode mixture. Preparatory pressing was carried out thereon, thereby producing a cathode mixture.

(3) Production of Solid Electrolyte Material Part

The following raw materials were put in a polypropylene container: 6.0 g of a $Li_2S$—$P_2S_5$-based amorphous solid electrolyte containing LiBr and LiI (average particle diameter 2.5 μm) as a solid electrolyte, and 0.05 g of a 5 mass % solution of butylene rubber-based resin in butyl butyrate as a binder. The container was subjected to ultrasonic treatment for 30 seconds in the ultrasonic disperser. Then, the container was shaken by a shaking device for 30 minutes, thereby preparing a paste for solid electrolyte material part.

An Al foil was used as a substrate, and the thus-prepared paste for solid electrolyte material part was applied on the Al foil by the blade method using the applicator. The foil was placed on the hot plate at 100° C. for 30 minutes to dry the applied paste, thereby obtaining a solid electrolyte material part. A total of three solid electrolyte material parts were prepared in this manner.

(4) Production of Battery Member

The anode mixture obtained in the above "(1) Production of anode mixture" and the solid electrolyte material part obtained in the above "(3) Production of solid electrolyte material part" were stacked so that they were in contact with each other. For densification of a current collector-anode mixture-solid electrolyte material part-aluminum foil laminate thus obtained, a pressure of 5 kN/cm was applied to the laminate by a roll press machine, in the condition of a roll gap of 100 μm and a feed rate of 0.5 m/min. The aluminum foil used as the substrate of the solid electrolyte material part, was removed from the laminate, thereby obtaining a current collector-anode mixture-solid electrolyte material part laminate.

The cathode mixture obtained in the above "(2) Production of cathode mixture" and the solid electrolyte material part obtained in the above "(3) Production of solid electrolyte material part" were stacked so that they were contact with each other. For densification of a current collector-cathode mixture-solid electrolyte material part-aluminum foil laminate thus obtained, a pressure of 5 kN/cm was applied to the laminate by the roll press machine, in the condition of a roll gap of 100 μm and a feed rate of 0.5 m/min. The aluminum foil used as the substrate of the solid electrolyte material part, was removed from the laminate, thereby obtaining a current collector-cathode mixture-solid electrolyte material part laminate.

Using a jig, the densified current collector-anode mixture-solid electrolyte material part laminate was cut into a circle having a diameter of 13.00 mm, and the densified current collector-cathode mixture-solid electrolyte material part laminate was cut into a circle having a diameter of 11.28 mm.

The current collector-anode mixture-solid electrolyte material part laminate cut into the circle and the solid electrolyte material part prepared in the above "(3) Production of solid electrolyte material part" were stacked so that the solid electrolyte material parts were in contact with each other. Then, the aluminum foil used as the substrate was removed from the solid electrolyte material part prepared in the above "(3) Production of solid electrolyte material part".

The resulting current collector-anode mixture-solid electrolyte material part laminate having the solid electrolyte material part transferred thereon, and the current collector-cathode mixture-solid electrolyte material part laminate were stacked so that the current collector-cathode mixture-solid electrolyte material part laminate was located in the center of the current collector-anode mixture-solid electrolyte material part laminate, and the solid electrolyte material parts were in contact with each other. In this state, a pressure of 200 MPa was applied thereto for one minute at 130° C., thereby obtaining a battery member comprising the current collectors.

(5) Production of all-Solid-State Lithium Ion Secondary Battery

The thus-obtained battery member was charged with constant voltage and constant current at 3-hour rate (1/3 C) to a predetermined voltage, thereby obtaining an all-solid-state lithium ion secondary battery (cut-off current 1/100 C).

3. Evaluation of Sulfide Solid Electrolyte Particles (1) Measurement of BET Specific Surface Area, Median Diameter and Density The BET specific surface area ($m^2/g$) of each sulfide solid electrolyte was measured by a specific surface area measuring device (product name: NOVA E2000, manufactured by: Quantachrome Instruments Japan G.K.)

The median diameter D50 (μm) of each sulfide solid electrolyte was measured by a dynamic light scattering (DLS) particle size distribution analyzing device (product name: NANOTRAC WAVE, manufactured by: Microtrac-BEL Corp.)

The density ($g/cm^3$) of each sulfide solid electrolyte was measured by a specific gravity measuring device (product name: AUW120D SMK-401, manufactured by: Shimadzu Corporation).

(2) Electron Microscope Observation

SEM observation was carried out on each sulfide solid electrolyte.

In the SEM observation, the number average short diameters of the sulfide electrolyte particles after the first and second grinding steps, were calculated.

(3) Evaluation of Cycle Characteristics

The all-solid-state lithium ion secondary batteries produced by use of the sulfide solid electrolyte particles of Examples 1 to 6 and Comparative Examples 1 to 5, were each discharged with current density and current voltage.

First, each all-solid-state lithium ion secondary battery was discharged (cut-off current 1/100 C). The discharged battery was charged with constant voltage and constant current at 3-hour rate (1/3 C) to a predetermined voltage. Then, the battery was discharged with constant current and constant voltage at 3-hour rate (1/3 C) to a predetermined voltage, and measured for the discharge capacity in the first cycle.

In the same condition, the charge-discharge cycle was repeated 5 times, and the discharge capacity in the fifth cycle was measured.

The capacity retention rate in the fifth cycle was calculated by dividing the discharge capacity in the fifth cycle by the discharge capacity in the first cycle.

Table 1 shows the production conditions of Examples 1, Example 2, Comparative Example 1 and Comparative Example 2. Table 2 shows the evaluation results of the sulfide solid electrolyte particles obtained by the production methods of Example 1, Example 2, Comparative Example 1 and Comparative Example 2, and the evaluation results of the all-solid-state lithium ion secondary batteries produced by use of the sulfide solid electrolyte particles.

Table 3 shows the production conditions of Examples 3 to 6 and Comparative Examples 1 and 3 to 5. Table 4 shows the evaluation results of the sulfide solid electrolyte particles obtained by the production methods of Examples 3 to 6 and Comparative Examples 1 and 3 to 5, and the evaluation results of the all-solid-state lithium ion secondary batteries produced by use of the sulfide solid electrolyte particles.

In Tables 2 and 4, the evaluation results of the all-solid-state lithium ion secondary batteries are shown as the capacity retention rates in the fifth cycle compared to the case where the capacity retention rate in the fifth cycle of the all-solid-state lithium ion secondary battery of Comparative Example 1, is determined as 100%.

TABLE 1

| | First grinding step | | Second grinding step | | |
|---|---|---|---|---|---|
| | Grinding time (h) | Kinetic energy A (J) per grinding medium | Grinding time (h) | Kinetic energy B (J) per grinding medium | Total grinding time (h) |
| Example 1 | 1 | $1.0 \times 10^{-5}$ | 1 | $1.2 \times 10^{-7}$ | 2 |
| Example 2 | 2 | $1.0 \times 10^{-5}$ | 1 | $1.2 \times 10^{-7}$ | 3 |
| Comparative Example 1 | 4 | $1.0 \times 10^{-5}$ | 0 | — | 4 |
| Comparative Example 2 | 0 | — | 10 | $1.2 \times 10^{-7}$ | 10 |

TABLE 2

| | Properties of particles after the first grinding step | | | | | | Final product |
|---|---|---|---|---|---|---|---|
| | BET specific surface area ($m^2/g$) | Particle diameter D50 (μm) | Density ($g/m^3$) | Average short diameter (μm) | Form | Value X | BET specific surface area ($m^2/g$) |
| Example 1 | 20 | 2.0 | 2.22 | 0.2 | Flattened | 88.8 | 13 |
| Example 2 | 24 | 1.2 | 2.22 | 0.1 | Flattened | 63.9 | 12 |
| Comparative Example 1 | — | — | — | — | — | — | 28 |
| Comparative Example 2 | — | — | — | — | — | — | 8 |

TABLE 2-continued

|  | Final product | | | | | Capacity retention rate (%) in the fifth cycle compared to Comparative Example 1 |
|---|---|---|---|---|---|---|
|  | Particle diameter D50 (μm) | Density (g/m³) | Average short diameter (μm) | Form | Value X |  |
| Example 1 | 0.7 | 2.22 | 0.5 | Spherical | 20.2 | 108 |
| Example 2 | 0.7 | 2.22 | 0.5 | Spherical | 18.6 | 107 |
| Comparative Example 1 | 0.7 | 2.22 | 0.08 | Flattened | 43.5 | 100 |
| Comparative Example 2 | 0.7 | 2.22 | 0.7 | Spherical | 12.4 | 108 |

TABLE 3

|  | First grinding step | | Second grinding step | | | |
|---|---|---|---|---|---|---|
|  | Grinding time (h) | Kinetic energy A (J) per grinding medium | Grinding time (h) | Kinetic energy B (J) per grinding medium | Temperature (° C.) | Total grinding time (h) |
| Comparative Example 3 | 1 | $1.0 \times 10^{-5}$ | 3 | $3.5 \times 10^{-7}$ | 25 | 4 |
| Example 3 | 1 | $1.0 \times 10^{-5}$ | 3 | $3.5 \times 10^{-7}$ | 40 | 4 |
| Example 4 | 1 | $1.0 \times 10^{-5}$ | 2 | $3.5 \times 10^{-7}$ | 50 | 3 |
| Example 5 | 2 | $1.0 \times 10^{-5}$ | 3 | $3.5 \times 10^{-7}$ | 50 | 5 |
| Example 6 | 4 | $1.0 \times 10^{-5}$ | 4 | $3.5 \times 10^{-7}$ | 50 | 8 |
| Comparative Example 4 | 1 | $1.0 \times 10^{-5}$ | 3 | $1.0 \times 10^{-6}$ | 50 | 4 |
| Comparative Example 5 | 1 | $1.0 \times 10^{-5}$ | 3 | $2.0 \times 10^{-6}$ | 50 | 4 |
| Comparative Example 1 | 4 | $1.0 \times 10^{-5}$ | 0 | — | — | 4 |

TABLE 4

|  | Properties of particles after the first grinding step | | | | | | Final product |
|---|---|---|---|---|---|---|---|
|  | BET specific surface area (m²/g) | Particle diameter D50 (μm) | Density (g/m³) | Average short diameter (μm) | Form | Value X | BET specific surface area (m²/g) |
| Comparative Example 3 | 20 | 2.0 | 2.22 | 0.2 | Flattened | 88.8 | 24 |
| Example 3 | 20 | 2.0 | 2.22 | 0.2 | Flattened | 88.8 | 12 |
| Example 4 | 20 | 2.0 | 2.22 | 0.2 | Flattened | 88.8 | 10 |
| Example 5 | 24 | 1.2 | 2.22 | 0.11 | Flattened | 63.9 | 11 |
| Example 6 | 28 | 0.7 | 2.22 | 0.07 | Flattened | 43.5 | 11 |
| Comparative Example 4 | 20 | 2.0 | 2.22 | 0.2 | Flattened | 88.8 | 22 |
| Comparative Example 5 | 20 | 2.0 | 2.22 | 0.2 | Flattened | 88.8 | 24 |
| Comparative Example 1 | — | — | — | — | — | — | 28 |

|  | Final product | | | | | Capacity retention rate (%) in the fifth cycle compared to Comparative Example 1 |
|---|---|---|---|---|---|---|
|  | Particle diameter D50 (μm) | Density (g/m³) | Average short diameter (μm) | Form | Value X |  |
| Comparative Example 3 | 1.50 | 2.22 | 0.08 | Flattened | 79.9 | 100 |
| Example 3 | 0.83 | 2.22 | 0.5 | Spherical | 22.1 | 108 |
| Example 4 | 0.80 | 2.22 | 0.5 | Spherical | 17.8 | 108 |
| Example 5 | 0.82 | 2.22 | 0.4 | Spherical | 20 | 108 |
| Example 6 | 0.91 | 2.22 | 0.4 | Spherical | 22.2 | 108 |

TABLE 4-continued

| | | | | | | |
|---|---|---|---|---|---|---|
| Comparative Example 4 | 1.30 | 2.22 | 0.1 | Flattened | 63.5 | 100 |
| Comparative Example 5 | 1.30 | 2.22 | 0.1 | Flattened | 69.3 | 100 |
| Comparative Example 1 | 0.70 | 2.22 | 0.08 | Flattened | 43.5 | 100 |

As shown in Tables 1 and 2, for the sulfide solid electrolyte particles obtained by the production method of Comparative Example 1 in which only the first grinding step was carried out in the single condition for 4 hours by such a strong grinding energy that the kinetic energy per grinding medium was $1.0 \times 10^{-5}$ (J), the median diameter was as sufficiently small as 0.7 μm. On the other hand, the BET specific surface area was as large as 28 m²/g, since the particles were particles in flattened form.

Figure 2:
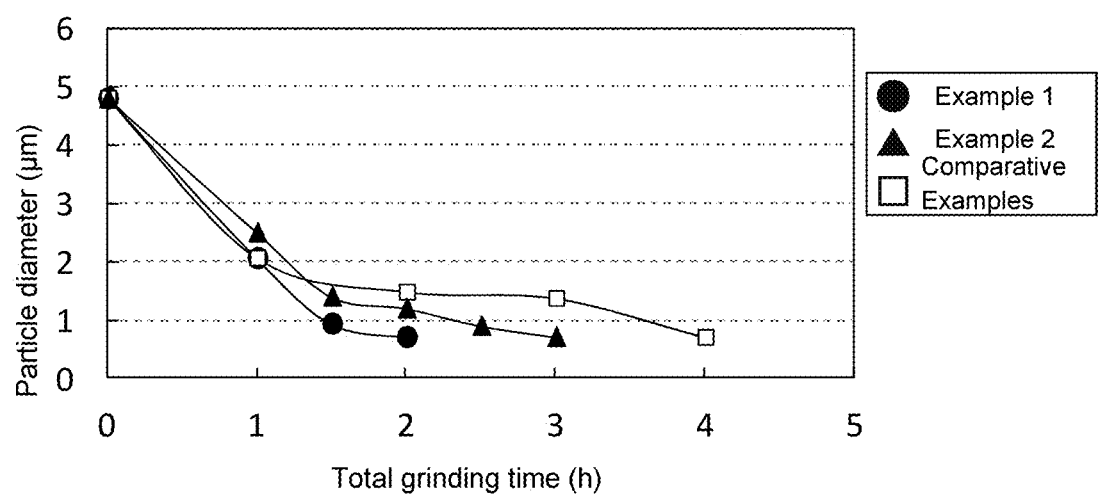
FIG. 2 is a graph showing, for production methods of Example 1, Example 2 and Comparative Example 1, a relationship between total grinding time and particle diameter.
Figure 3:
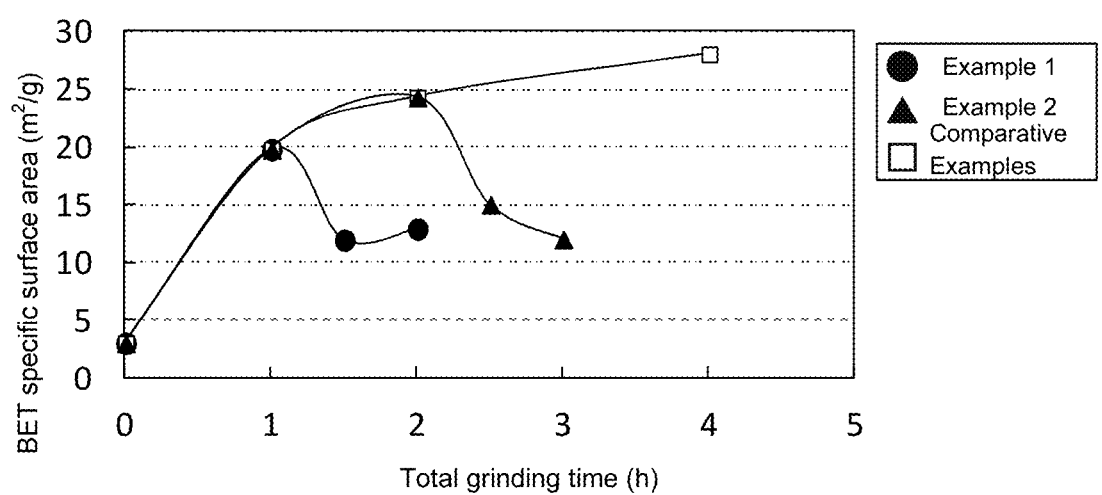
FIG. 3 is a graph showing, for the production methods of Example 1, Example 2 and Comparative Example 1, a relationship between total grinding time and BET specific surface area.
Figure 5:
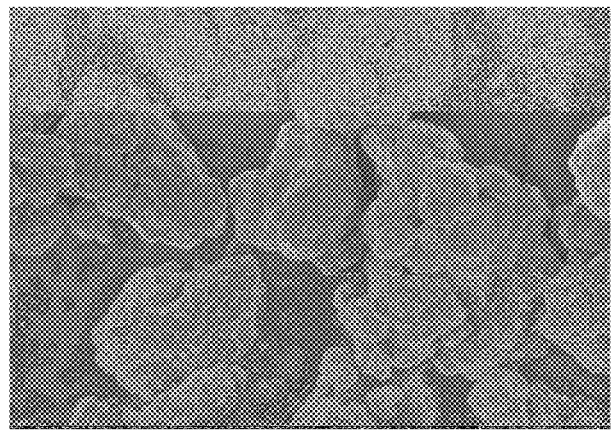
FIG. 5 is shows SEM images of a sulfide solid electrolyte after being ground for predetermined periods of time in the production method of Comparative Example 1.
Figure 5:
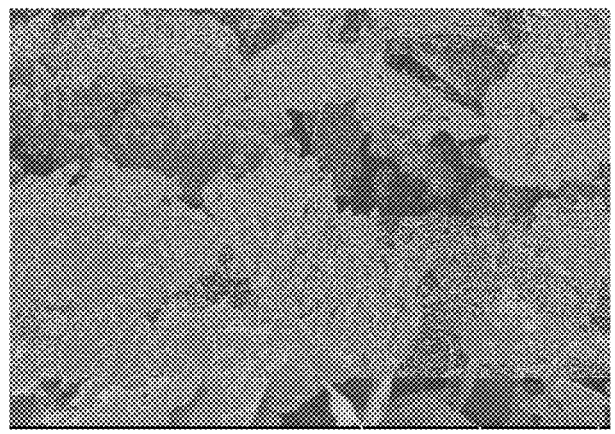
Figure 5:
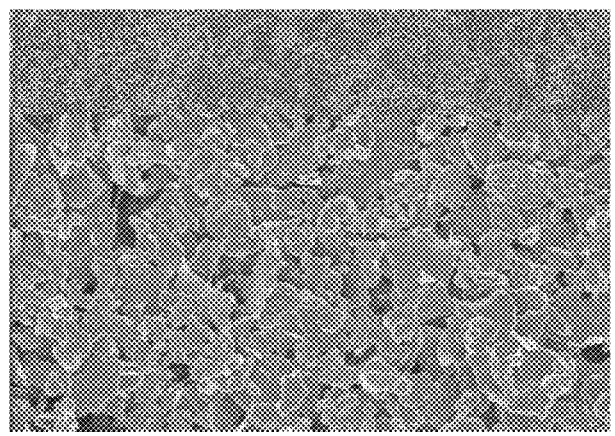

For Comparative Example 1, as shown in FIGS. 2 and 3, as the grinding time proceeded, the particle diameter simply decreased and the BET specific surface area increased. Also for Comparative Example 1, as shown in FIG. 5, it was confirmed that the sulfide solid electrolyte was in flattened form in all of the processes.

As shown in Tables 1 and 2, for the sulfide solid electrolyte particles obtained by the production method of Comparative Example 2 in which only the second grinding step was carried out in the single condition by such a weak grinding energy that the kinetic energy per grinding medium was $1.2 \times 10^{-7}$ (J), the median diameter was as sufficiently small as 0.7 μm, and the particles were particles in spherical form. On the other hand, Comparative Example 2 needed a total grinding time of 10 hours, and the sulfide solid electrolyte particles were not efficiently obtained.

Meanwhile, as shown in Tables 1 and 2 and FIG. 2, for the sulfide solid electrolyte particles obtained by the production method of Example 1 in which the second grinding step (that was carried out for one hour by such a weak grinding energy that the kinetic energy B per grinding medium (hereinafter it will be simply referred to as "kinetic energy B") was $1.2 \times 10^{-7}$ (J)) was carried out after the first grinding step (that was carried out for one hour by such a strong grinding energy that the kinetic energy A per grinding medium (hereinafter it will be simply referred to as "kinetic energy A") was $1.0 \times 10^{-3}$ (J)), the median diameter was as sufficiently as small as 0.7 μm, although the total grinding time was half the total grinding time of Comparative Example 1 and one-fifth the total grinding time of Comparative Example 2. Also, since the particles were particles in spherical form, the BET specific surface area was as small as 13 m²/g.

Also, as shown in Tables 1 and 2 and FIG. 2, for the sulfide solid electrolyte particles obtained by the production method of Example 2 in which the second grinding step (that was carried out for one hour by such a weak grinding energy that the kinetic energy B was $1.2 \times 10^{-7}$ (J)) was carried out after the first grinding step (that was carried out for two hours by such a strong grinding energy that the kinetic energy A was $1.0 \times 10^{-5}$ (J)), the median diameter was as sufficiently small as 0.7 μm, although the total grinding time was one hour shorter than that of Comparative Example 1 and 7 hours shorter than that of Comparative Example 2. Also, since the particles were particles in spherical form, the BET specific surface area was as small as 12 m²/g.

Figure 4:
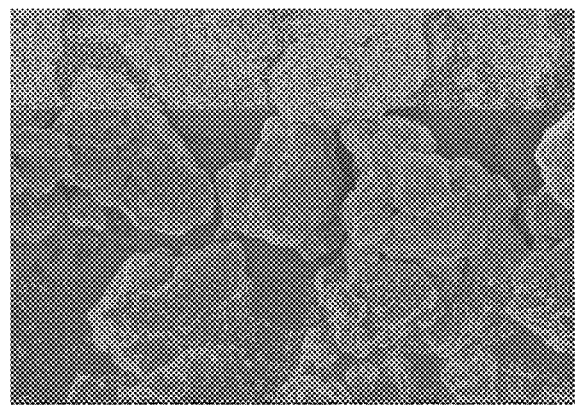
FIG. 4 shows SEM images of a sulfide solid electrolyte after being subjected to the steps of the production method of Example 1.
Figure 4:
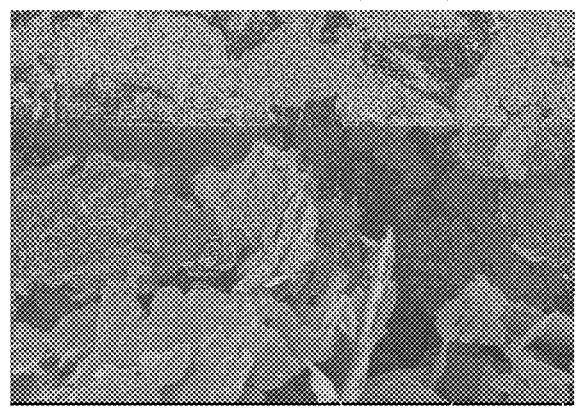
Figure 4:
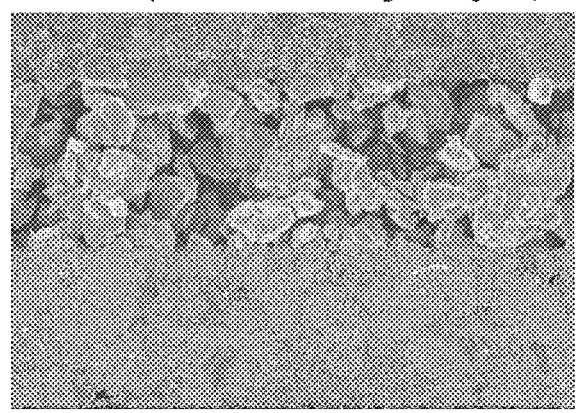

As shown in FIG. 2, in the production methods of Examples 1 and 2, the particle diameter simply decreased as the grinding time proceeded. Meanwhile, as shown in FIG. 3, the BET specific surface area started to decrease simultaneously with the start of the second grinding step. As shown in FIG. 4, in Example 1, the sulfide solid electrolyte was in flattened form after the first grinding step, and it was in spherical form after the second grinding step.

As shown in Table 2, for the all-solid-state lithium ion battery produced by use of, in the case of using the elemental Si as the anode active material, the sulfide solid electrolyte particles in spherical form of Example 1, Example 2 or Comparative Example 2 as the material for the anode mixture, the capacity retention rate was higher than that of the all-solid-state battery produced by use of the sulfide solid electrolyte in flattened form of Comparative Example 1.

Since the sulfide solid electrolyte in flattened form of Comparative Example 1 had a large specific surface area, the conductive material was likely to attach to the solid electrolyte particles and, as a result, a part where the density of the conductive material was low, was formed in the anode. Therefore, it is thought that an electron conducting path in the part where the density of the conductive material was low, was gradually cut as the volume of the whole anode was expanded and contracted by discharging.

Meanwhile, since the sulfide solid electrolytes in spherical form of Example 1, Example 2 and Comparative Example 2 had a small specific surface area, the conductive material was less likely to attach to the solid electrolyte particles and was uniformly distributed in the anode. Therefore, it is thought that the electron conducting path was not cut even though the volume of the whole anode was expanded and contracted by charging and discharging.

Next, the influence of the temperature of the second grinding step will be discussed. As shown in Tables 3 and 4, the sulfide solid electrolyte particles obtained by the production method of Comparative Example 3 in which the second grinding step (that was carried out for three hours at 25° C. by the kinetic energy B of $3.5 \times 10^{-7}$ (J)) was carried out after the first grinding step (that was carried out for one hour by the kinetic energy A of $1.0 \times 10^{-5}$ (J)) were particles in flattened form. Therefore, the BET specific surface area was as large as 24 m²/g.

The reason seems to be as follows: although the kinetic energy B of the second grinding step is smaller than the kinetic energy A of the first grinding step, as shown in FIG. 1, the kinetic energy B is more than $1.6 \times 10^{-7}$ (J) and too high.

Meanwhile, as shown in Tables 3 and 4, for the sulfide solid electrolyte particles obtained by the production method of Example 3 in which the second grinding step (that was carried out for three hours by the kinetic energy B of $3.5 \times 10^{-7}$ (J)) was carried out after the first grinding step (that was carried out for one hour by the kinetic energy A of $1.0 \times 10^{-3}$ (J) as with the case of Comparative Example 3) and the temperature of the second grinding step was changed to 40° C., the median diameter was as sufficiently small as 0.83 μm. Also, since the particles were particles in spherical form, the BET specific surface area was as small as 12 m²/g.

Also, for the sulfide solid electrolyte particles obtained by the production method of Example 4 in which the second grinding step (that was carried out for two hours by the kinetic energy B of 3.5×10⁻⁷ (J)) was carried out after the first grinding step (that was carried out for one hour by the kinetic energy A of 1.0×10⁻⁵ (J) as with the case of Comparative Example 3) and in which the temperature of the second grinding step was changed to 50° C., the median diameter was as sufficiently small as 0.80 μm. Also, since the particles were particles in spherical form, the BET specific surface area was as small as 10 m²/g.

The reason seems to be as follows: when the kinetic energy B of the second grinding step is 3.5×10⁻⁷ (J), the particles are particles in flattened form in the condition of a temperature of 25° C., and they are particles in spherical form in the condition of a temperature of 40° C. or more.

In the case of Comparative Example 4 (in which the kinetic energy B in the second grinding step was 1.0×10⁻⁶ (J)) and Comparative Example 5 (in which the kinetic energy B of the second grinding step was 2.0×10⁻⁶ (J)), even though the temperature of the second grinding step was set to 50° C., the thus-obtained sulfide solid electrolyte particles were particles in flattened form, and the BET specific surface area was as large as 63.5 m²/g or more. Therefore, it is thought that when the kinetic energy B of the second grinding step is 1.0×10⁻⁶ (J) or more and too large, sulfide solid electrolyte particles in spherical form are not obtained even if the temperature is set to 40° C. or more.

From the results of Examples 5 and 6, it is thought that the grinding times of the first and second grinding steps have no large influence on the form of the sulfide solid electrolyte thus obtained.

From the above results, it was revealed that the sulfide solid electrolyte particles which are particles in spherical form and which have a small particle diameter, are efficiently obtained by the production method of the disclosed embodiments, the method comprising: preparing a sulfide solid electrolyte material, grinding the sulfide solid electrolyte material by mechanical milling to obtain particles in flattened form (a first grinding step), and grinding the particles in flattened form by mechanical milling to obtain sulfide solid electrolyte particles in spherical form (a second grinding step), wherein a relationship A (J)>B (J) is satisfied, where A (J) is a kinetic energy (½(mv²)) per grinding medium used in the first grinding step, and B (J) is a kinetic energy (½(mv²)) per grinding medium used in the second grinding step.

The invention claimed is:

1. A method for producing sulfide solid electrolyte particles, the method comprising:
preparing a sulfide solid electrolyte material,
grinding the sulfide solid electrolyte material by mechanical milling, thereby obtaining particles in flattened form (a first grinding step), and
grinding the particles in flattened form by mechanical milling, thereby obtaining sulfide solid electrolyte particles in spherical form (a second grinding step),
wherein a relationship A (J)>B (J) is satisfied, where A (J) is a kinetic energy (½(mv²)) per grinding medium used in the first grinding step, and B (J) is a kinetic energy (½(mv²)) per grinding medium used in the second grinding step,
wherein the kinetic energy A per grinding medium used in the first grinding step is in a range of from 3.0×10⁻⁷ (J) to 1.0×10⁻⁵ (J),
wherein a value X of the particles in flattened form obtained by the following Formula (1) is 25 or more, and
wherein a value X of the particles in spherical form is lower than the value X of the particles in flattened form, $$X = \text{BET specific surface area}(m^2/g) \times \text{median diameter } D50(\mu m) \times \text{density}(g/cm^3).$$ Formula (1):

2. The method for producing the sulfide solid electrolyte particles according to claim 1, wherein a median diameter ($D_{50}$) of the particles in flattened form obtained in the first grinding step is 2.0 μm or less, and a median diameter ($D_{50}$) of the sulfide solid electrolyte particles obtained in the second grinding step is 1.0 μm or less.

3. The method for producing the sulfide solid electrolyte particles according to claim 1, wherein the kinetic energy B per grinding medium used in the second grinding step is in a range of from 1.0×10⁻⁸ (J) to 1.6×10⁻⁷ (J).

4. The method for producing the sulfide solid electrolyte particles according to claim 1, wherein the kinetic energy B per grinding medium used in the second grinding step is in a range of from 1.0×10⁻⁸ (J) to 3.5×10⁻⁷ (J); and a grinding temperature used in the second grinding step is 40° C. or more.

5. The method for producing the sulfide solid electrolyte particles according to claim 1, wherein the value X of the particles in flattened form obtained by formula (1) is 30 or more.

6. The method for producing the sulfide solid electrolyte particles according to claim 1, wherein the value X of the particles in flattened form obtained by formula (1) is 40 or more.

7. The method for producing the sulfide solid electrolyte particles according to claim 1, wherein the value X of the particles in spherical form obtained by formula (1) is 35 or less.

8. The method for producing the sulfide solid electrolyte particles according to claim 1, wherein the value X of the particles in spherical form obtained by formula (1) is 30 or less.

9. The method for producing the sulfide solid electrolyte particles according to claim 1, wherein the value X of the particles in spherical form obtained by formula (1) is 23 or less.

* * * * *